United States Patent

Doninelli

[11] Patent Number: 5,871,166
[45] Date of Patent: Feb. 16, 1999

[54] TAPE CASSETTE AND DRIVE MOTOR WITH ROTOR ROTATABLY SUPPORTED BY CASSETTE REEL

[75] Inventor: Peter D. Doninelli, Morgan Hill, Calif.

[73] Assignee: Xerox Corporation, Stamford, Conn.

[21] Appl. No.: 887,071

[22] Filed: Jul. 2, 1997

[51] Int. Cl.$^6$ .................................................... G11B 15/00
[52] U.S. Cl. .......................................... 242/340; 242/342
[58] Field of Search ................................... 242/340, 342, 242/345, 349; 360/96.3, 96.5

[56] References Cited

U.S. PATENT DOCUMENTS

| | | | |
|---|---|---|---|
| 4,303,210 | 12/1981 | Fujita et al. | 242/340 |
| 5,409,174 | 4/1995 | Doninelli | 242/342 |
| 5,433,397 | 7/1995 | Lalouette et al. | 242/340 |

*Primary Examiner*—John P. Darling
*Attorney, Agent, or Firm*—Robert Cunha

[57] ABSTRACT

A combination of a tape cassette and a tape drive motor wherein a shaft is connected to a tape reel. A tape reel support is mounted to the housing of the cassette and a tape reel shaft extends through the support. Bearings are carried by the support for rotatably supporting the tape reel shaft and thereby the tape reel on the cassette housing. The motor has a rotor rotatable about an axis with the rotor being loosely mounted in the motor when a cassette is not in the tape drive. In one embodiment of the invention, the rotor carries a magnet which in combination with magnetically attractive material carried by the shaft, operates to connect the rotor to the shaft to effect a driving relationship between the rotor and shaft when the cassette is in the tape drive. The bearings on the cassette for the tape reel shaft served as the sole bearings for the rotor for rotational support when the rotor rotates and drives the shaft and thereby the tape reel. In another embodiment of the invention, one axial end of the rotor is connected to the tape reel shaft and the opposite axial end has a pointed end which engages pivot bearings to render stability to the rotor against possible rotor whip when the rotor is rotating. In this embodiment, the rotor is primarily supported for rotation by the bearings on the cassette and is secondarily supported by the pivot bearings on the motor housing.

9 Claims, 6 Drawing Sheets

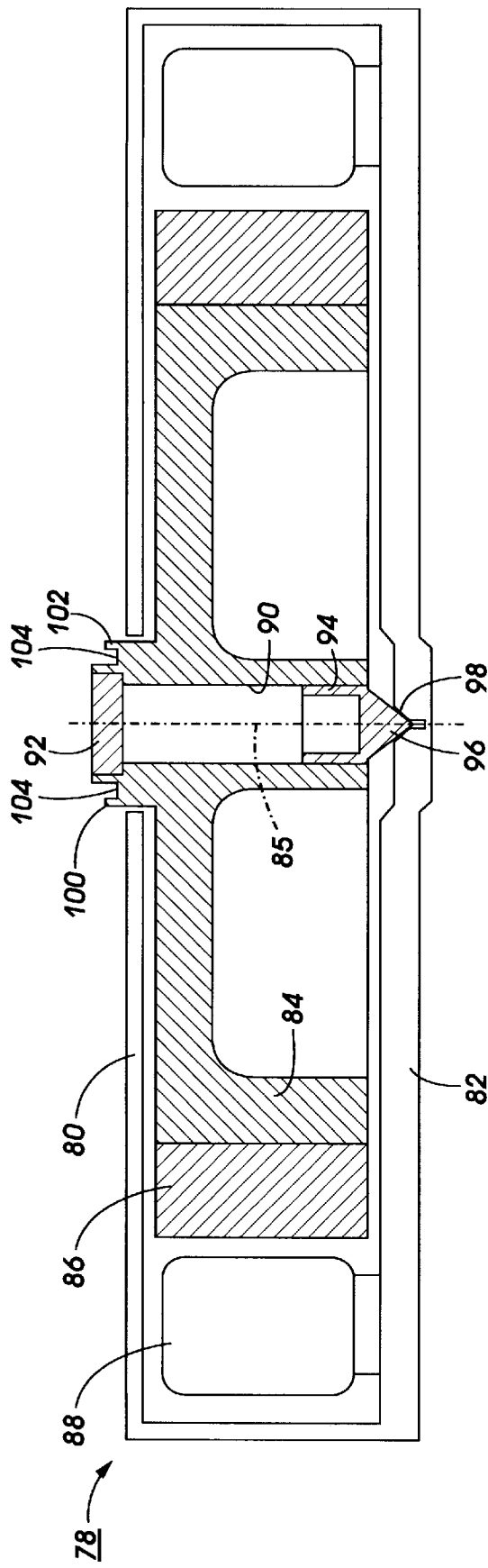
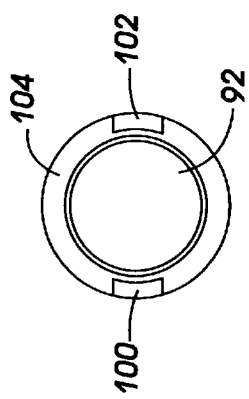
FIG. 4
FIG. 5

5,871,166

TAPE CASSETTE AND DRIVE MOTOR WITH ROTOR ROTATABLY SUPPORTED BY CASSETTE REEL

BACKGROUND OF INVENTION

In a normal tape cassette, tape drive combination, a motor is connected to each tape reel carried by the cassette to drive the reels. In high speed tape cassettes, a high speed tape search can occur at 500 ips (inches per second) to 1000 ips with acceleration and deceleration rates of 1000 ips to 2000 ips. These kinds of search speeds, acceleration, deceleration rates and sudden reverse and forward movements cause tremendous wear and tear on the motor bearings causing eventual failure of the bearings necessitating replacement of the motor or rebuilding the motor about every 10 million passes over a tape guide. This becomes a very expensive proposition. Also, due to the wear and tear, the reliability of the drive increasingly decreases as the number of cycles increase. Reliability of the drive is very important at the above speeds of search, acceleration and deceleration.

A solution to this problem is to make the motor bearings a consumable item by rotatably mounting the tape reels by bearings onto the tape cassette and utilize those bearings as either the sole or primary bearings for the rotor of a motor when the motor is connected to the tape reel to drive the reel. This way, the reliability of the tape drive is increased. The cassette is designed to last in excess of 300,000 passes over a tape guide. Therefore, each time a cassette is disposed of and replaced by a new cassette, the drive system will have new bearings. In the long run, the cost of the cumulative consumable cassette bearings compared to the equivalent life of a motor bearing will be less than replacing the motor.

SUMMARY OF INVENTION

This invention relates to a combination of a tape cassette and a tape drive motor wherein a shaft is connected to a tape reel. A tape reel support is mounted to the housing of the cassette and a tape reel shaft extends through the support. Bearings are carried by the support for rotatably supporting the tape reel shaft and thereby the tape reel on the cassette housing. The motor has a rotor rotatable about an axis with the rotor being loosely mounted in the motor when a cassette is not in the tape drive. In one embodiment of the invention, the rotor carries a magnet which in combination with magnetically attractive material carried by the shaft, operates to connect the rotor to the shaft to effect a driving relationship between the rotor and shaft when the cassette is in the tape drive. The bearings on the cassette for the tape reel shaft serve as the sole bearings for the rotor for rotational support when the rotor rotates and drives the shaft and thereby the tape reel. In another embodiment of the invention, one axial end of the rotor is connected to the tape reel shaft and the opposite axial end has a pointed end which engages pivot bearings to render stability to the rotor against possible rotor whip when the rotor is rotating. In this embodiment, the rotor is primarily supported for rotation by the bearings on the cassette and is secondarily supported by the pivot bearings on the motor housing.

BRIEF DESCRIPTION OF DRAWINGS

FIG. 4 is a simplified section view of a tape drive motor;

FIG. 5 is a top view of a part of a rotor which is shown in FIG. 4;

DETAILED DESCRIPTION OF INVENTION

Figure 1:
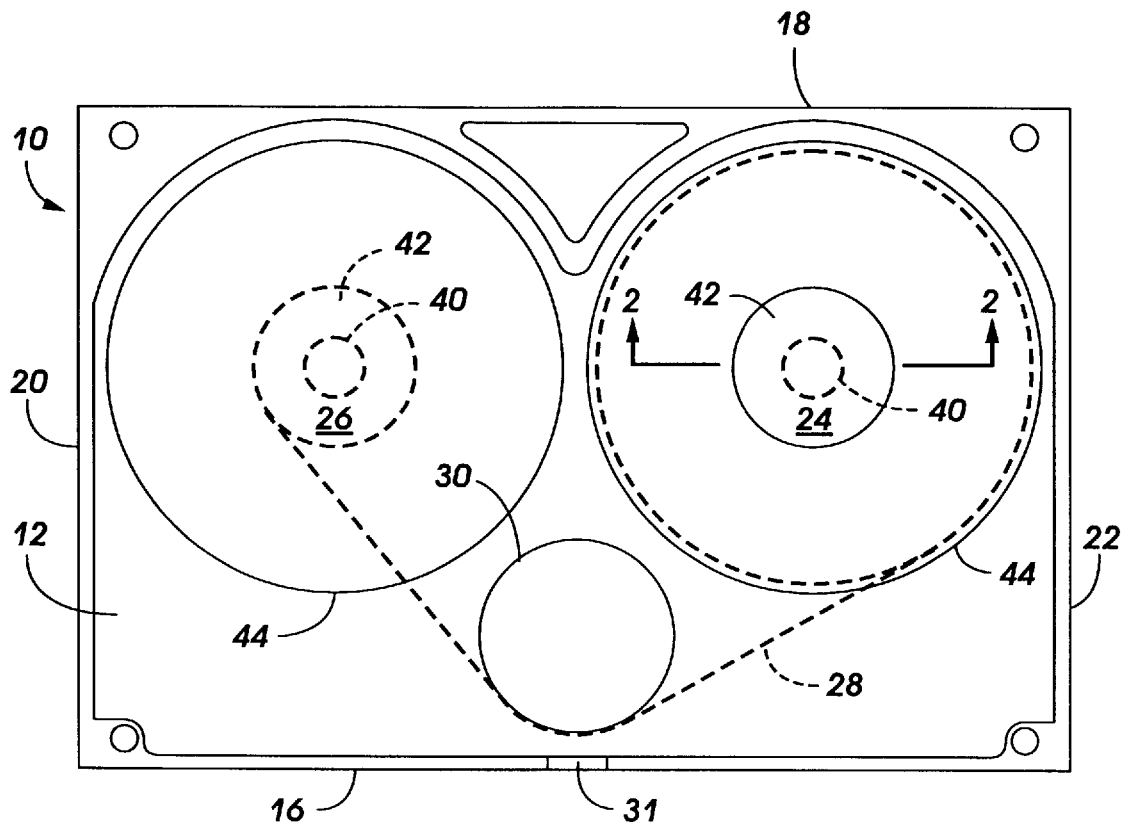
FIG. 1 is a top view of a tape cassette.

Referring to FIG. 1, a top view of a tape cassette 10 is shown. The tape cassette comprises generally a closed housing which has a bottom wall or base plate 12, a top wall 14, (FIG. 2) which is not shown in this view for simplicity, a front wall 16, a rear wall 18 and two side walls 20 and 22.

A tape reel 24 and a tape reel 26 are rotatably mounted on the base plate 12. Tape 28 is wound on the tape reel 24 and extends across a tape guide 30 onto the tape reel 26.

Figure 2:
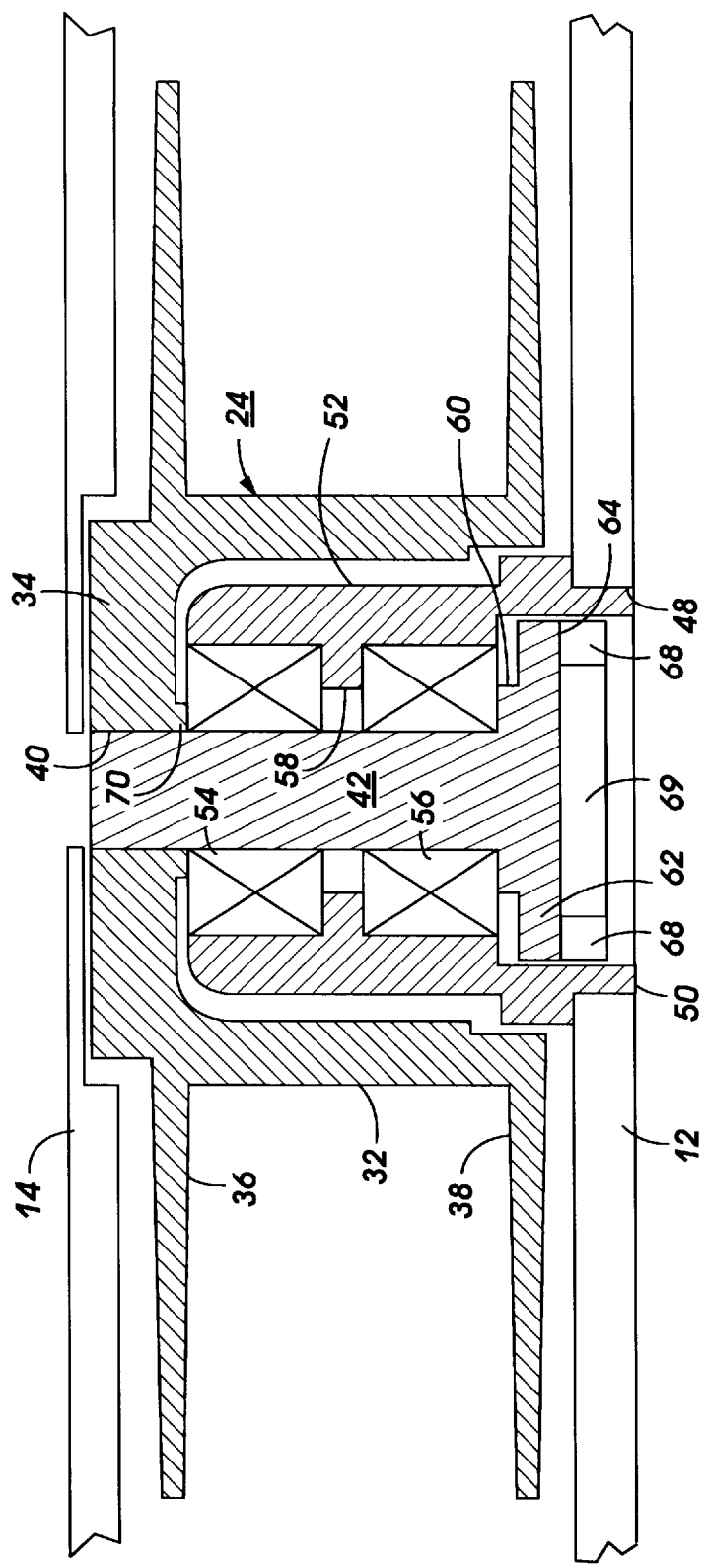
FIG. 2 is a section view along section line 2—2 of FIG. 1 showing a tape reel and its rotatable mounting to the cassette.

Referring to FIG. 2, a cross section of the rotatable mounting of tape reel 24 to base plate 12 of cassette 10 is shown. The rotatable mounting to the base plate 12 of tape reel 26 is the same and therefore the description of the mounting of tape reel 24 will apply to the mounting of tape reel 26. The tape reel 24 is a one piece member and comprises an annular wall 32, a closed upper cap portion 34, an upper tape guide flange 36 and a bottom guide flange 38. The cap portion 34 has an opening 40 for receiving a shaft 42 therethrough which is press fitted to the cap portion 34.

Still referring to FIG. 2, the base plate 12 has an opening 48 receiving a bottom end 50 of a cylindrical bearing retention member 52 therethrough. The retention member 52 is bonded at its bottom end 50 to the base plate 12 by any well known method. Axially spaced apart annular bearing assembly members 54 and 56 are located within the bearing retention member 52 and are separated by an annular rib 58 which is integral with the annular wall of the bearing retention member 52. The bearing assembly members are preferably ball bearings and can be any well known bearing assembly. At the lower end of the shaft 42, there is an annular bearing retention portion 60 located just above a motor interconnect portion or drive hub 62.

Figure 3:
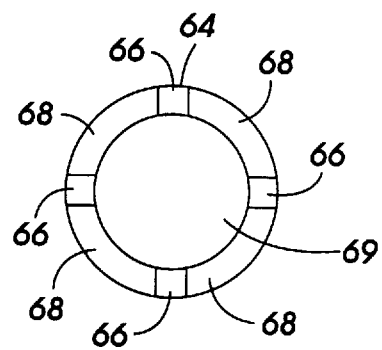
FIG. 3 is a bottom view of a drive hub which is shown in FIG. 2.

Referring to FIG. 3, an annular surface 64 is at the bottom of the drive hub 62 and has four drive slots 66 circumferentially spaced 90 degrees from each other and separated by lands 68 extending downwardly from the surface 64. Each drive slot 66 and land 68 extends in an arc about the axis of the shaft 42. While four drive slots are shown, the number of drive slots utilized can be a matter of design preference. A recess 69 is formed in the drive hub 62 and is defined by the lands 68. The drive hub 62 is made of a magnetically attractive material for a purpose to be explained hereinafter.

The reel 32 is assembled to the cassette housing by inserting the bearing assembly 54 into the top of the bearing retention member 52 whereupon it engages the rib 58. The bearing assembly 56 is slipped over the upper end of the shaft 42 and engages bearing retention portion 60 and then the upper end of the shaft 42 is inserted inside the bearing retention member 52 and through the bearing assembly 54 until the bearing assembly 56 engages the rib 58. The shaft 42 is held in place while the reel 32 is slipped over the bearing retention member 52 and the shaft 42 is received into opening 40 of the cap portion 34 and press fitted to the reel The cap portion 34 has an annular stop shoulder 70 which engages the top of the bearing assembly 54 to retain the bearing assembly 54 against the rib 58 and still provide a clearance between the bottom surface of the top portion 34 and the bearing retention member 52. The reel 24 is now mounted for rotation about the axis of the bearing retention member 52 and thereby rotatably mounted on the base plate 12 of the cassette 10.

Referring to FIG. 4, a motor 78 is shown and is attached to a tape drive (not shown). The motor is of common motor design and comprises a motor housing having an upper wall 80 and a bottom wall 82, a rotor 84 with a magnet 86 having a plurality of north and south poles attached to the outer periphery thereof and a coil ring having a plurality of coils 88. The number of magnets and coils utilized will depend upon the results desired. The rotor has a hollow axially extending opening 90. A magnet 92 is secured to the rotor 84 at the upper end of the opening 90 and a support member 94 is secured to the lower end of opening 90. The support member 94 has a pointed lower end 96 which is received within a mating recess 98 in the bottom wall 82 of the motor housing for rotatably supporting the rotor at the bottom of the recess in a loosely mounted or free standing position when a tape cassette is not present in the tape drive. Referring to FIG. 5, at the upper end of the rotor 84 are a pair of diametrically spaced tangs 100 and 102 projecting upwards from an annular surface 104. Each tang 100, 102 extends in an arc about the axis 85 of the rotor 84.

Figure 6:
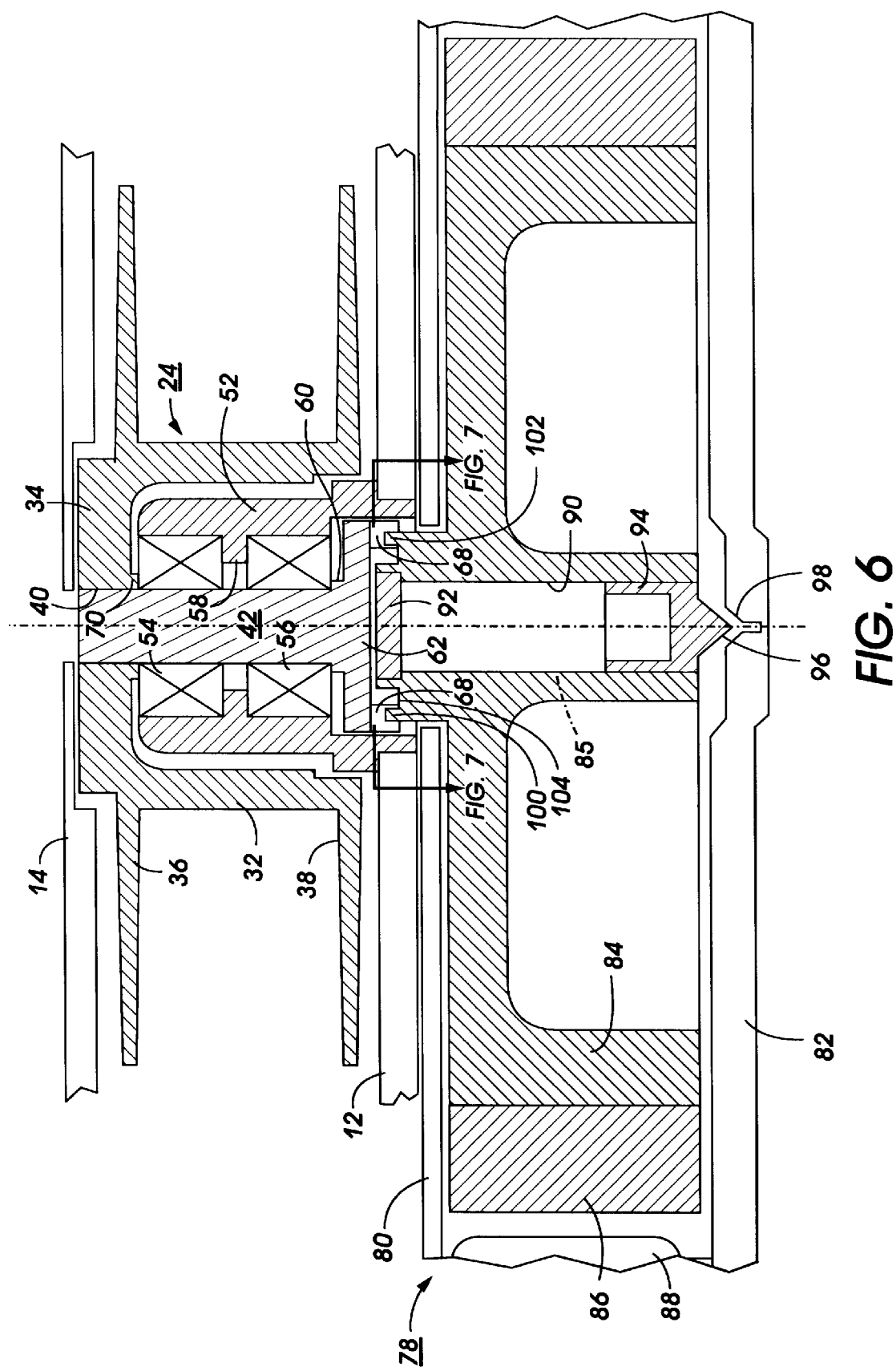
FIG. 6 is a simplified section view showing the motor of FIG. 4 being in driving connection with the tape reel of FIG. 2.
Figure 7:
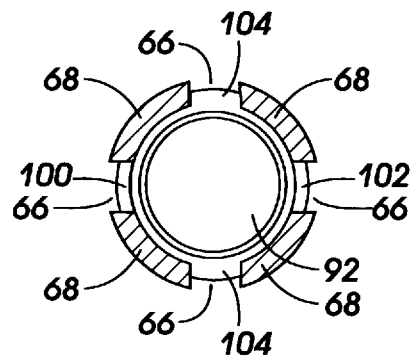
FIG. 7 is a section view along section line FIG. 7—FIG. 7 of FIG. 6 showing a driving connection between the rotor and drive hub utilizing the elements of each shown in FIGS. 3 and 5.

Referring to FIG. 6, there is shown the reel 24 of FIG. 2 inserted into a tape drive and connected to the motor 78 of FIG. 4. Referring to FIGS. 6 and 7, the radial thickness of each slot 66 and the circumferential distance of each slot 66 is slightly larger than the corresponding dimensions of each tang 100, 102 so each tang will fit into each of the slots 66 to form a driving connection between the drive hub 62 and the rotor 84. The driving connection is formed when the cassette 10 is inserted into the tape drive which causes the drive hub 62 to be lowered into contact with the rotor 84 where the tangs 100 and 102 on the rotor rest on or contact the lands 68 on the hub 62 or, if the tangs are aligned with the slots 66, the tangs will enter a respective slot 66 and the magnet 92 will enter the recess 69 in the drive hub 62. If the tangs 100 and 102 are on the lands 68, then the tangs 100, 102 will enter a corresponding slot 66 upon partial revolution of the rotor 84 when the motor is started. The system can be designed to energize the motor upon insertion of the cassette into the drive to thereby rotate the rotor a partial revolution to ensure that the tangs 100 and 102 are located in the slots upon insertion of the cassette into the drive. The magnet 92 and the magnetically attractive material of the drive hub 62 form a magnetic attraction which is strong enough to urge the rotor 84 towards the drive hub 62 that when the tangs 100, 102 are aligned with their corresponding slots 66, the rotor will be lifted off of and be suspended from the bottom of the recess 98 and the tangs 100 and 102 will enter into their respective slot 66. FIG. 7 shows a section of the drive connection taken on a plane FIG. 7—FIG. 7 of FIG. 6 which is between the magnet 92 and the top wall of the recess 69 and looking in a direction toward the magnet 92.

The axial length of the lands 68 is designed to be longer than the axial length of the tangs 100, 102 so the lands will bottom on the surface 104 to keep the magnet slightly spaced from the closed end of the recess 69. At this point, the rotor 84 is in an operative position where it is rotatably supported solely by the bearing assemblies 54 and 56 on the cassette 10.

In operation, rotation of the rotor 84 will result in the edges of the tangs 100, 102 engaging a corresponding edge of a land 68 to transmit rotation of the rotor 84 to the drive hub 62 thereby rotating the shaft 42 and the reel 24. The shaft 42 will rotate about the bearing assemblies 54 and 56 and the rotor will be taking its rotational support through the shaft 42 with the magnetic attraction of magnet 92 and the magnetically attractive material of the drive hub 62 keeping the rotor 84 constantly in driving contact with the drive hub 62 and constantly suspended from the bottom wall of the recess 98. When the cassette 10 is removed from the guide, the hub 62 is lifted away from the rotor 84 and magnet 92 which overcomes the magnetic attraction between the magnet 92 and the magnetically attractive material of hub 62 to disengage the hub 62 from the rotor 84. The slight space between the magnet 92 and the closed end of the recess 69 aids in this disengagement.

While the magnet 92 in the motor in the embodiment of FIGS. 1–7, is described as being attached to the rotor 84, it should be understood that the magnet could be attached to hub 62 and the rotor 84 could have magnetically attractive material in place of the magnet 92.

Figure 8:
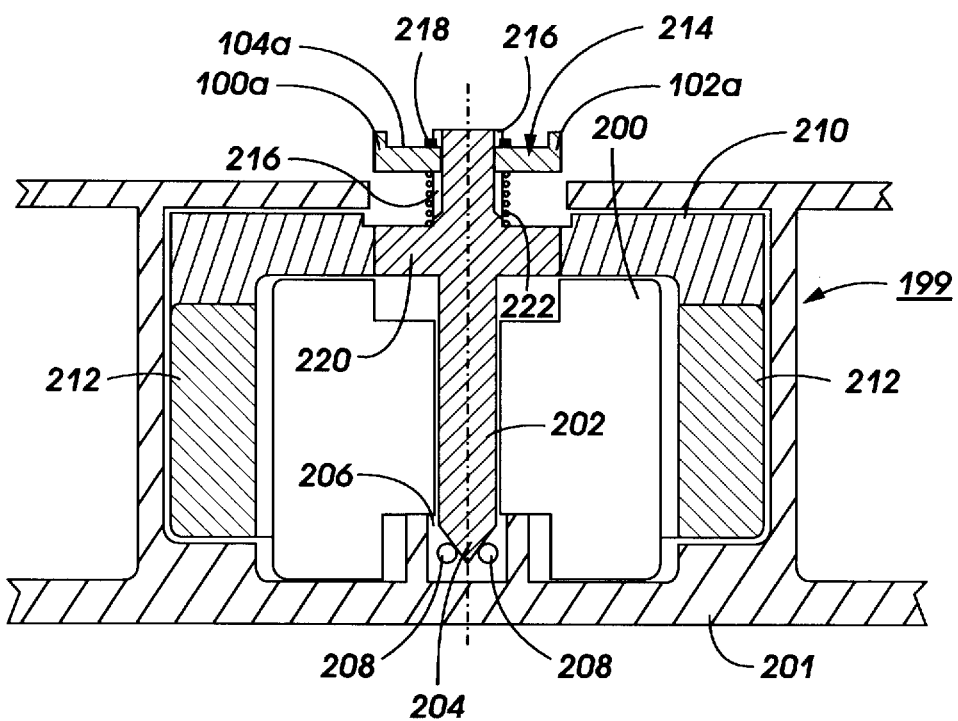
FIG. 8 is a section view of a different embodiment of a tape drive motor.

Referring to FIG. 8, there is shown the invention being applied to a motor 199 with an external rotor and internal coils. Those elements that are the same as the previous embodiment are designated by the same reference numerals, only with an "a" affixed thereto. The motor is for driving the same reels 24 and 26 on cassette 10. A stationary coil ring having a plurality of coils 200 is mounted (not shown) on a bottom wall 201 of the motor housing. A motor shaft 202 is located within the coils 200 and has a pointed or cone shaped bottom end 204 which is received within a receptacle 206 extending from bottom wall 201 and which has a plurality of pivot bearings 208 therein against which the pointed end 204 of the shaft 202 may engage in a loosely mounted or free standing position when a tape cassette is not present in the tape drive. An annular rotor 210 surrounds the coils 200 and is bonded to an annular shoulder 220 on the shaft 202 for rotation with the shaft 202. A magnet 212 having a plurality of north and south poles is attached to the rotor 210. At the upper end of the motor shaft 202 is a tang drive member 214 which is slideably mounted in an axial direction on the motor shaft 202. The tang drive member has a pair of diametrically spaced tangs 100a and 102a projecting upwards from an annular surface 104a. The shaft 202 has a plurality of peripherally spaced and axially extending splines 216 and the tang drive member has a plurality of spaced projections which extend into the splines to slideably guide tang member 214 for axial movement on the shaft 202. A snap ring 218 is secured to the shaft 202 to secure the tang drive member 214 to the shaft. A compression spring 222 surrounds the shaft 202 and is located between the shoulder 220 and the bottom surface of the tang drive member 214 to urge the tang drive member 214 into engagement with the snap ring 218.

Figure 9:
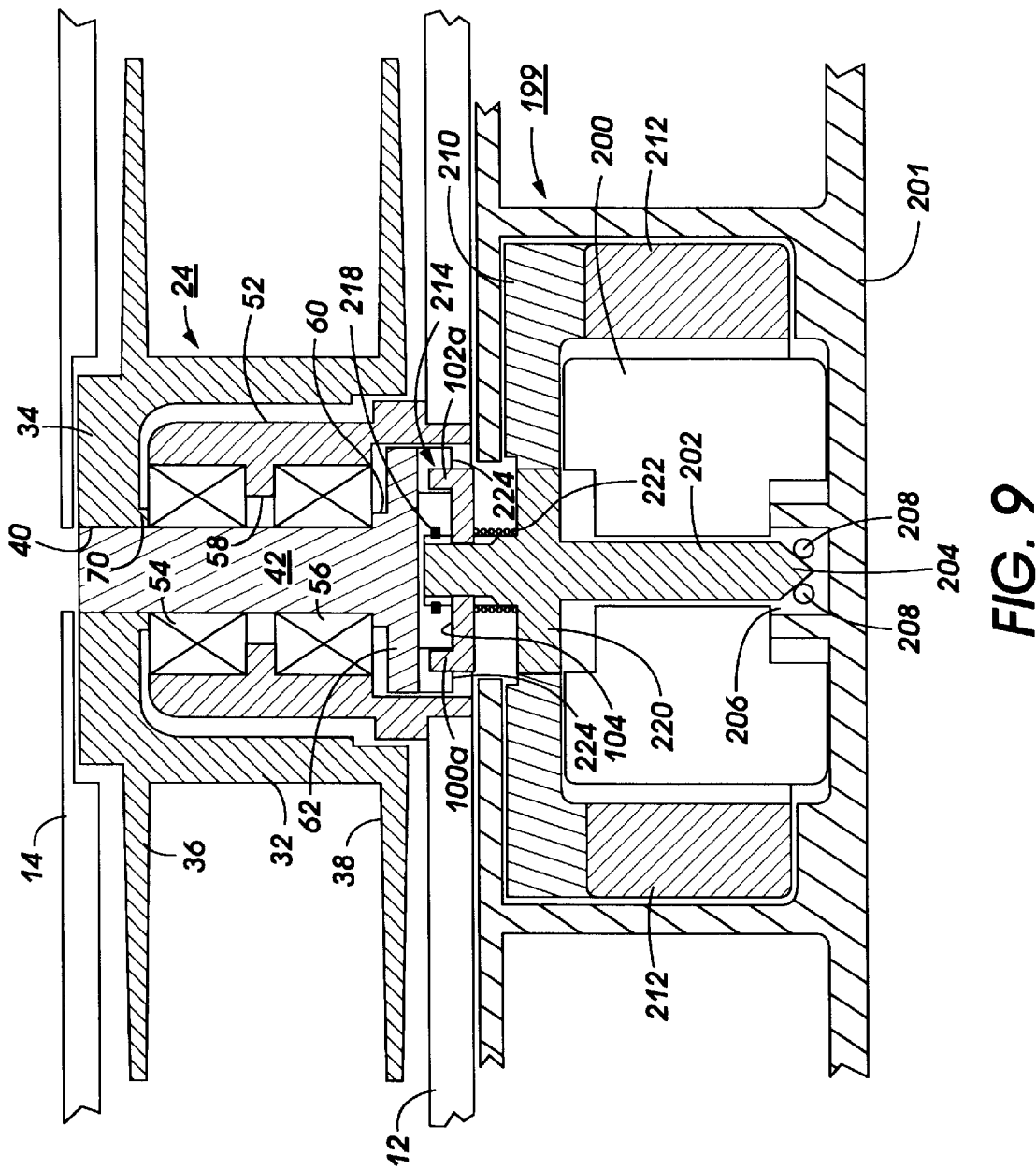
FIG. 9 is a simplified section view showing the motor of FIG. 8 being in driving connection with the tape reel of FIG. 2.

Referring to FIG. 9, there is shown the reel 24 of FIG. 2 inserted into a tape drive and connected to the motor 199 of FIG. 8. The axial distance between the bottom surface 224 of the lands 68 and the point of contact of the shaft pointed end 204 with the bearings 208 is less than the axial distance between the surface 104 on the tang drive member 214 and the point of contact between the shaft pointed end 204 with the bearings 208 when the tang drive member 214 is fully extended to contact the snap ring 218. This will effect the tang drive member 214 being forced axially away in a downwards direction from the snap ring 218 as contact is made between the drive hub 62 and the tangs 100a and 102a. When the tangs 100a, 102a are aligned with their corresponding slots 66 and the surface 224 of the lands 68 contact the surface 104, the tang drive member 214 will still be forced axially away in a downwards direction from the snap ring 218 resulting in the spring 222 being compressed from its original shape to force or keep the pointed end 204 into contact with the bearings 208 when the cassette is inserted into the tape drive. At this point, the motor shaft 202 and thereby the rotor 210 is in an operative position where it is primarily supported at the upper end for rotation by bearing assemblies 54 and 56 on the cassette 10 and secondarily supported at the lower end for rotation by bearings 208 in the motor housing. The rotor support at the pointed end 204 by the bearings 208 renders stability to the rotor against possible rotor whip when the rotor is rotating.

The operation of the combination of the motor and cassette in FIG. 9 is the same as the operation of the combination of the motor and cassette in FIG. 6. Rotation of the rotor 210 will result in the edges of the tangs 100a, 102a engaging a corresponding edge of a land 68 to transmit rotation of the rotor 210 to the drive hub 62 thereby rotating the shaft 42 and the reel 24. The shaft 42 will rotate about the bearing assemblies 54 and 56 and the rotor will be taking its rotational support on the bearing assemblies 54 and 56 through the shaft 42 and also on the bearings 208 in the motor housing. The compression spring 222 will keep the rotor 210 in constant driving contact with the drive hub 62. When the cassette 10 is removed from the tape drive, the hub 62 is lifted away from the rotor 210 to disengage the hub 62 from the rotor 210

While the rotor in the motor of each embodiment is described as containing magnets and the coils of the motor are stationary, it should be understood that in ordinary motor design, the coils could be rotating and thus be the rotor and the magnets could be stationary Also, it should be understood that the rotor 84 could be provided with bearings 208 for the pointed end 96 and be modified at the top to be constructed with the spring biased tang drive member 214 and thus be supported for rotation by the cassette bearings 54 and 56 and the bearings 208. Furthermore, it should be understood that rotor 210 could be modified to have the upper end of the rotor 84 with the magnet 92 and be solely supported for rotation by the cassette bearings 54 and 56.

I claim:

1. In a combination of a tape cassette and a tape drive motor:
   a) said tape cassette comprising a housing, a tape reel inside said housing, a shaft connected to said tape reel, tape reel support means fixedly mounted to said housing, said shaft extending through said support means, bearing means operably connected to said support means and said shaft for rotatably connecting said shaft and thereby said tape reel to said support means;
   b) said tape drive motor having a rotor rotatable about an axis;
   c) means operably connecting said rotor to said shaft in such a manner to effect a driving rotational relationship between said rotor and said shaft generally about the same axis; and
   d) said bearing means being the sole bearing means for rotational support of said rotor when said rotor rotates and drives said shaft and thereby said reel.

2. The combination as recited in claim 1 wherein said operable connection between said rotor and said shaft comprises a magnetic connection.

3. The combination as recited in claim 2 wherein said operable connection between said rotor and said shaft further comprises tangs and slots for receiving said tangs.

4. The combination as recited in claim 1 wherein said operable connection between said rotor and said shaft is disengageable.

5. The combination as recited in claim 1 wherein said operable connection between said rotor and said shaft comprises tangs and slots for receiving said tangs.

6. In a combination of a tape cassette and a tape drive motor:
   a) said tape cassette comprising a housing, a tape reel inside said housing, a shaft connected to said tape reel, tape reel support means fixedly mounted to said housing, said shaft extending through said support means, bearing means operably connected to said support means and said shaft for rotatably connecting said shaft and thereby said tape reel to said support means:
   b) said tape drive motor having a rotor rotatably about an axis;
   c) said rotor having two opposite ends with the center of each end being located on said axis;
   d) means operably connecting one of said ends of said rotor to said shaft in such a manner to effect a driving rotational relationship between said rotor and said shaft generally about said axis;
   e) said motor having bearing means located adjacent to and contacting the other of said ends of said rotor; and
   f) said bearing means on said support means for said tape reel being the primary bearing means and said bearing means in said motor being a secondary bearing means for rotational support of said rotor when said rotor rotates and drives said shaft and thereby said reel, 7. The combination as recited in claim 6 wherein said operable connection between said rotor and said shaft comprises tangs and slots for receiving said tangs.

8. The combination as recited in claim 6 wherein said operable connection between said rotor and said shaft is disengageable.

9. The combination as recited in claim 6 wherein:
   a) said other of said ends of said rotor being generally cone shaped;
   b) said bearing means in said motor being pivot bearings; and
   c) the surface of said generally cone shaped end contacting said pivot bearings.

* * * * *